United States Patent [19]

Waller

[11] 3,992,620
[45] Nov. 16, 1976

[54] DYNAMIC LIGHT REFERENCE SYSTEM FOR FILM READER

[75] Inventor: Robert W. Waller, Northridge, Calif.

[73] Assignee: Information International, Inc., Culver City, Calif.

[22] Filed: May 21, 1975

[21] Appl. No.: 579,486

[52] U.S. Cl. .............................. 250/205; 250/227; 250/570
[51] Int. Cl.² ........................................ G01J 1/32
[58] Field of Search ........... 250/227, 216, 566, 567, 250/568, 570, 555, 556, 205; 235/61.11 E; 340/146.3 F, 146.3 AC

[56] References Cited
UNITED STATES PATENTS

| | | | |
|---|---|---|---|
| 2,571,306 | 10/1951 | Szegho | 250/205 |
| 2,779,819 | 1/1957 | Graham et al. | 250/205 |
| 2,804,550 | 8/1957 | Artzt | 250/205 |
| 3,443,026 | 5/1969 | Townsend | 250/205 |
| 3,476,482 | 11/1969 | Howard et al. | 250/227 |
| 3,566,353 | 2/1971 | Gray | 250/566 |
| 3,835,315 | 9/1974 | Gravitt | 250/227 |
| 3,885,878 | 5/1975 | Ishak | 250/227 |

*Primary Examiner*—David C. Nelms
*Attorney, Agent, or Firm*—Lindenberg, Freilich, Wasserman, Rosen & Fernandez

[57] ABSTRACT

In a film reader, a system is provided for deriving a dynamic reference signal proportional to the intensity of light in a flying spot scanner without obstructing any radiation from the scanner to a film being read comprising light guides each disposed with one end in an annular bracket which surrounds the flux path to the film and the other end of all light guides bundled together at the face of an auxiliary photometer. The one end of each guide is held in the annular bracket with its viewing axis pointing back toward the scanner. The viewing axes of the guides are evenly spaced and arranged to pass through a circle centered on the emitting surface of the flying spot scanner. The circle is preferably of greater diameter than the scanner.

15 Claims, 2 Drawing Figures

DYNAMIC LIGHT REFERENCE SYSTEM FOR FILM READER

BACKGROUND OF THE INVENTION

This invention relates to a method and apparatus for providing a dynamic reference of light in a scanning system, and more particularly to a method and apparatus for measuring intensity of a spot of light in a flying spot scanner for use as a dynamic reference in such applications as film reading.

Using film as a medium for recording scientific data has many advantages. It may be used, for example, to record oscilloscope traces, including A-scope or other radar formats; tracking pictures of missiles or aircraft (theodolite film); astronomical and meterological data; bubble chamber data; medical data; and the like. Film is also an ideal medium for recording traces of very high bandwidth (up to several thousands megacycles) which can not be easily recorded in any other way. In addition, because of the small input power and limited storage space that are required, film is particularly suitable for recording data in space vehicles or aircraft; wind and current measuring devices; and other similar devices.

The problem with film recording has been reading or transcribing the data from film once it has been recorded. It has generally been necessary for an analyst or researcher to read the data visually from the film and transcribe it by hand. This has been found to be a time-consuming, laborious and relatively expensive operation. Consequently, semi-automatic film reading devices have been developed for some applications. However, these semi-automatic film reading devices can read only about five thousand points a day, and require the attention of a human operator.

More recently there have been developed programmable film readers for automatically reading and digitizing very large quantities of film recorded data. A programmable film reader is operated completely under control of a programmed digital computer and therefore does not require the attention of a human operator. Film is read at a rate in excess of five thousand points per second. Data read may be recorded in digital form on magnetic tape for further computer processing and analysis.

The film reading process involves the selected scanning of film by a rapidly moving, programmable light point or spot on a visual display cathode ray tube coupled to the film by suitable optics. The output of this scanning operation is detected by a photosensitive device on the other side of the film. The output of the photosensitive device is coupled to a scan control and monitoring unit for process and analysis comprising a digital computer.

Since the light spot displayed on the cathode ray tube can be rapidly positioned under control of the digital computer, the film reader can be so programmed as to permit the data to be processed and analyzed on a real-time basis with the scanning process. In more conventional so-called "flying spot" scanning techniques, scanning takes place in a predetermined pattern of parallel lines. With line scanning, it is necessary to store the data for all points on each line read until all lines have been scanned before processing of the data can be started. That requires a large segment of computer memory to hole the unprocessed data. Extensive processing is then necessary to extract the significant data.

A true flying spot scanning technique permits a programmable film reader to be controlled by a stored computer program in such a way as to locate and track only the data of interest on the film. No further processing is required; the significant data is immediately available as output of the film reading process. However, locating and tracking only the data of interest requires more sensitive light detection in order to be able to operate over data superimposed on grid backgrounds, "noisy" data, and other complex types of film data. To achieve greater sensitivity, it is necessary to eliminate any false input due to noise and other fluctuations in the intensity of the flying spot.

In optical systems employing a light beam to develop a data signal as the beam passes through a medium, it has sometimes been the practice to split the beam in order to monitor the intensity of the beam with a photometer in the path of one split beam while the intensity of the other split beam directed through the medium is monitored by a main photometer. The problem with this split beam technique is that (i) energy is diverted from the primary path to the reference, (ii) energy is absorbed by the splitting element, and (iii) the rays in the primary path are distorted and require further correction in the imaging lens. Consequently, in applications where all of the available radiation is needed, the split beam technique is not as efficient as a dynamic reference. For example, in a film reader using a cathode ray tube as a flying spot scanner, all of the available radiation from the flying spot is needed to illuminate the film. The problem then is how to develop a dynamic reference in such a system without removing or blocking any light flux in the beam being coupled to the medium.

SUMMARY OF THE INVENTION

An object of this invention is to develop for a film reader a dynamic reference signal proportional to the intensity of radiation directed from a source to a medium without removing, blocking or otherwise obstructing any flux in the radiation to be coupled from the source to the medium.

Still another object is to monitor the intensity of a flying spot scanner in a film reader, and to provide a dynamic reference proportional to the intensity of light from the flying spot scanner for use in signal processing of data read from the film.

These and other objects of the invention are achieved by a plurality of light guides, such as optical fibers bunched in groups by ferrules to function as light guides, each light guide having its input end sufficiently displaced from the path of radiation between the light source and the medium so that no part of the light guide obstructs the radiation of any flux in the path from the source to the medium, and the input end of each light guide is pointed back in the direction of the light source with the optical axis of each light guide passing through a circle having its center at the center of the light source, and preferably with the optical axis of each light guide parallel to the optical axis between the light source and the medium. The other ends of the light guides are brought together and mixed randomly on the face of an auxiliary photometer, the output of which provides a reference signal for the processing of data signals obtained from a main photometer in the path of the light coupled from the source to the medium.

The novel features that are considered characteristic of this invention are set forth with particularly in the appended claims. The invention will best be understood from the following description when read in connection with the accompanying drawings.

DESCRIPTION OF THE PREFERRED EMBODIMENT

Figure 1:
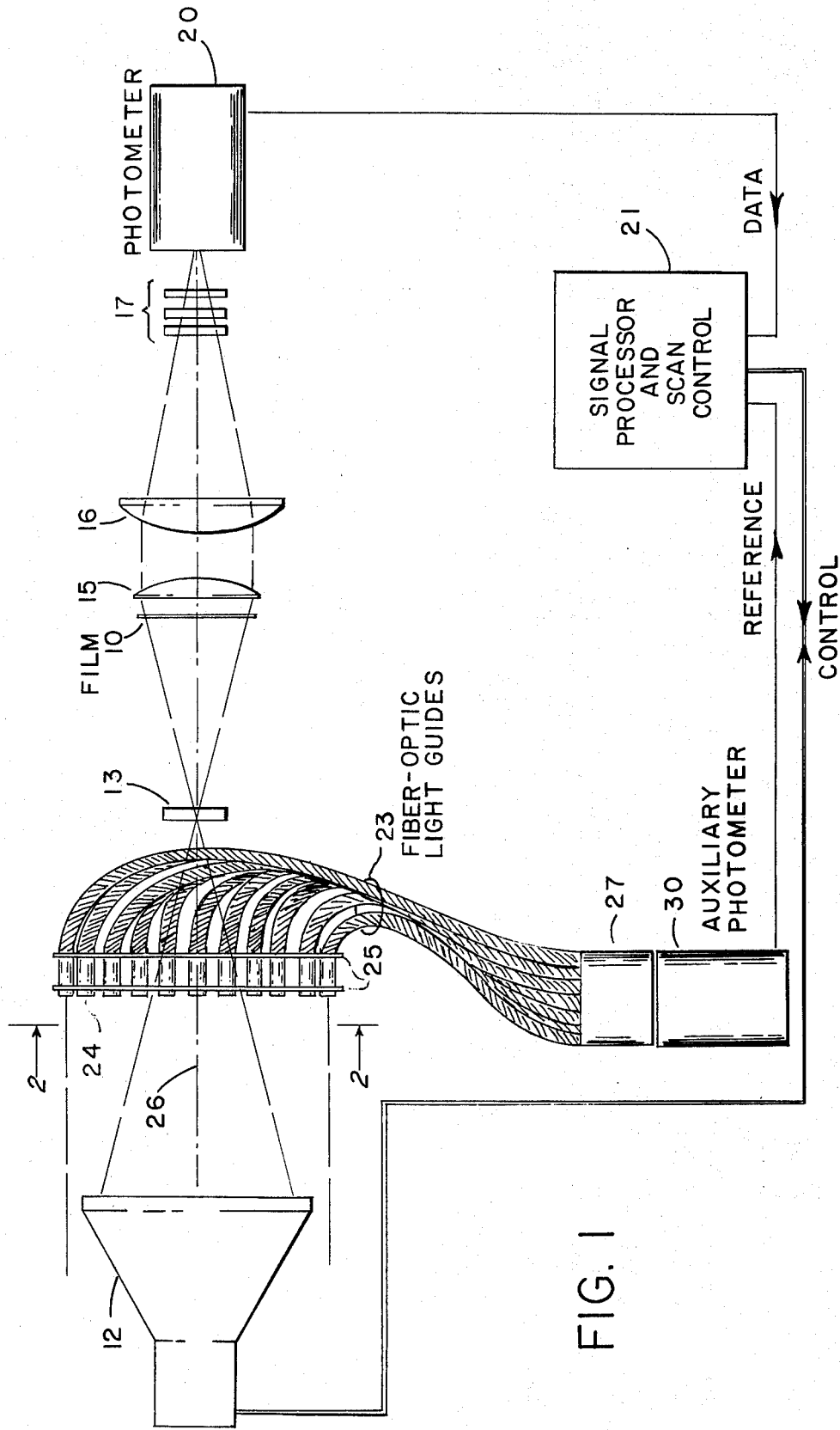
FIG. 1 is a schematic diagram illustrating an exemplary flying spot scanning system embodying the present invention.

FIG. 1 illustrates schematically the optical system of a basic film reader incorporating the present invention. Not shown is a transport for holding and stepping a film 10 from frame to frame for scanning by a controlled light source 12. Only the optical and electronic systems for processing film reading signals are shown.

The light source 12 is preferably a cathode ray tube (CRT) having a flat face employed as a flying spot scanner. Light from a spot on the face of the CRT enters the optical system comprising an enlarger lens 13, a first condenser lens 15, a second condenser lens 16 and filters 17, such as neutral density filters and dichroic trimmer filters. A photometer 20 converts the intensity of the radiation transmitted through the film at each spot scanned by the light source into an electrical signal of proportional amplitude for processing by an electronic signal processor 21 comprising a programmed digital computer.

The signal processor controls the positions of the spot on the face of the CRT, and thus controls the points of the film to be read out. Although a CRT is preferred for scanning the film (at the present state of the art), any other light source which can be controlled as to size, intensity and position within a predetermined area may be employed. In operation, light coming from the CRT light-source enters the optical system, passes through the enlarger and is focused on the film at a specified location. The light which passes through the film and condenser lenses is defocused and is sensed by the photometer 20. The photometer is preferably a photomultipler tube which is sensitive to small changes in the intensity light. The signal processor 21 conditions the data signals from the photometer and stores (in digital form) very large quantities of photographic data for further processing and analysis. The signal processor 21 also controls the light source 12 in scanning the film 11 to locate and track only the data of interest. This tracking process requires high sensitivity in scanning the film.

Figure 2:
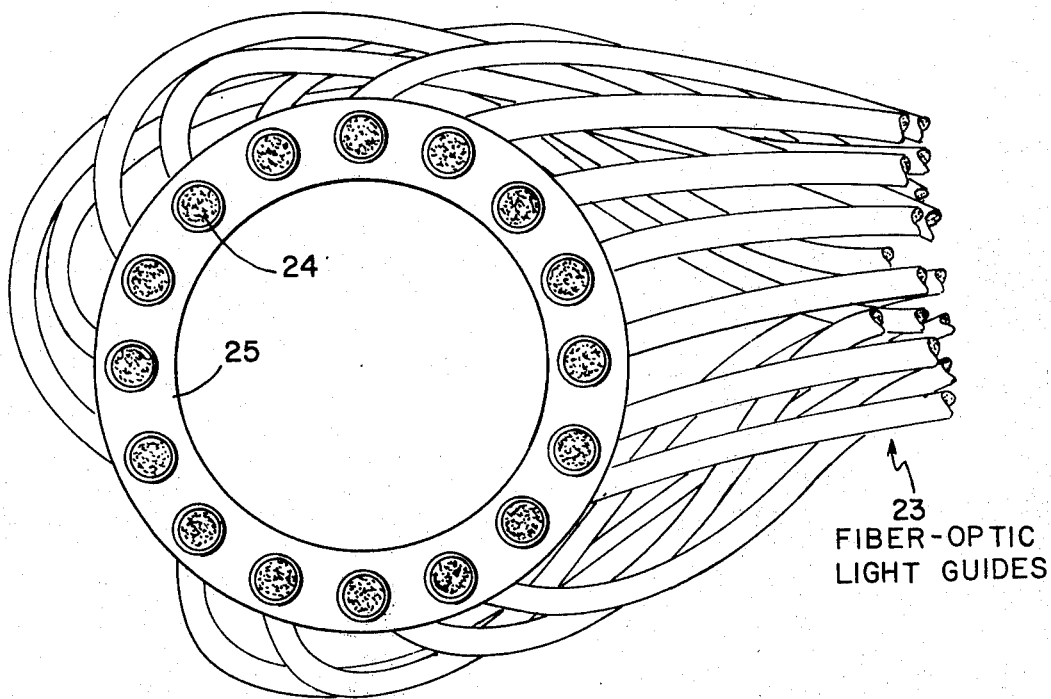
FIG. 2 is a view taken along line 2—2 in FIG. 1.

It is recognized that any fluctuations in the intensity of the scanning light would be interpreted by the signal processor as a variation in data, thereby not only introducing an error into the data but also causing an error in the tracking process. It is therefore desirable to provide the signal processor 21 with a reference signal which is at all times proportional to the intensity of the light source. That is accomplished in accordance with the present invention without removing, blocking or otherwise obstructing any flux in the radiation path between the source and the film by the use of a plurality of light guides 23, each light guide having one end 24 uniformly spaced in a annular bracket 25, as shown in FIG. 2. The bracket is such a diameter, and supported in such a position, as to be outside the radiation path between every point on the face of the CRT (within at least a predetermined rectangular area) and the enlarging lens 13.

The end 24 of each light guide is pointed back in the direction of the CRT such that its optical viewing axis passes through an imaginary circle centered on the face of the CRT, preferably of the same diameter as the bracket 25, such that the optical viewing axis of each light guide is parallel to the axis 26 of the system. The maximum acceptance angle of each light guide is typically about ±20°. Most of the radiation accepted is within an angle of ±10°. Between 10° and 20°, the acceptance factor changes rapidly to zero at the maximum angle.

The annular bracket 25 may be of larger diameter than the imaginary circle at the face of the CRT. In that case the optical viewing axis of each light guide will be at a small acute angle with the axis 26 of the optical system. However, as just noted, it is preferred to have the diameter of the circle formed by the end of the light guides the same as the imaginary circle at the face of the CRT, and greater than the diameter of the CRT, such as a 6 inch imaginary circle for a 5 inch CRT. This assures that no light guide will at any time be pointed directly at a spot of light on the face of the CRT, and thus provide a more uniform level of acceptance for all positions. It should also be noted that while 16 uniformly spaced light guides are preferred, a larger or smaller number of light guides may be employed. However, the optimum number appears to be 16. A larger number will not significantly improve performance, and only add to the complexity, while a smaller number will degrade performance, particularly if the number is reduced to four, or even eight.

Through this arrangement, the total flux collected by the light guides will be the same for any position of a spot of light of the same intensity on the face of the CRT. Consequently, by gathering the output ends of the light guides 23 in a large ring or ferrule 27, and positioning them within the ferrule 27 at random, an auxiliary photometer 30 placed with its window opposite the output ends will provide a reference signal which is directly proportional to the intensity of the light spot on the face of the CRT regardless of the position of the spot. The reference signal thus produced permits the signal processor 21 to determine the true amplitude of data signals of any error introduced by fluctuations in the intensity of the light source. The auxiliary photometer 30 is also implemented with a photomultiplier tube like the main photometer.

The light guides 23 are preferably implemented with "fiber optics," each light guide being comprised of literally thousands of optical fibers bundled in a ferrule and polished optically flat at its end 24. All of the optical fibers thus bundled together for one light guide are enclosed in a sheath of suitable plastic material for protection between the end 24 and the large ferrule 27. The optical fibers of the various light guides are "combed out" at the large ferrule so as to randomly intermingle the fibers of the various light guides. The large bundle of fibers in the ferrule 27 is then polished optically flat and placed directly opposite the window of the photometer 30. In that manner light flux entering the photometer window is randomly distributed to assure the amplitude of the reference signal will not depend upon the position of any light guide in the window since the amplitude of the reference signal should at all times be directly proportional to the unweighted sum of the flux received by all light guides, and not be influenced by the sensitivity of the photometer to light entering through any particular position of its window.

The reference signal produced by the photometer 30 is a dynamic reference which is continually amplified and compared with the data signal by the signal processor 21. The difference between the data and reference signals is used for scan control, and is further processed for storage in digital form (such as on magnetic tape) for further computer processing and analysis.

In the process of controlling the cathode ray tube as a "flying spot" scanner, the signal processor 21 continually measures density of the film by comparing the reference signal with the data signal, and makes the decision whether the film at a given point is more or less dense than a given comparison standard. The light source 13 may then be controlled to track recorded data on the film by moving the spot from point to point along the more dense path. For processing and analysis, the difference between this reference signal and the data signal may be quantized to up to 64 density levels. The 64 density levels may then be readily stored in digital form, as in a conventional binary code, for later processing.

Although particular embodiments of the invention have been described and illustrated herein, it is recognized that modifications and equivalents may readily occur to those skilled in the art. Consequently, it is intended that the following claims be interpreted to cover such modifications and equivalents.

The embodiments of the invention in which an exclusive property or privelege is claimed are defined as follows:

1. In a film reader, apparatus for generating a dynamic reference signal proportional to the intensity of light radiated from a source to a film, without interrupting or blocking any flux radiated from the source to the film through an optical system, comprising a photometer and means for collecting peripheral flux directly from around the path between said source and said optical system at evenly spaced locations around said source and said optical system at evenly spaced locations around said optical path and means for guiding radiation flux thus collected at each location to said photometer, and means for integrating and converting collected radiation flux into an electrical signal.

2. Apparatus as defined by claim 1 wherein said means for collecting peripheral flux comprises light guides disposed to collect and guide peripheral radiation from said locations to said photometer, each of said light guides having a uniform acceptance angle at one end thereof for radiation about a viewing axis, said one end of each of said guides being uniformly spaced in a circle around said path between said source and said optical system, the optical viewing axis passing through an imaginary circle having its center at the center of said light source.

3. Apparatus as defined in claim 2 wherein said imaginary circle is of greater diameter than said source.

4. Apparatus as defined by claim 3 wherein said light source is a scanner in which a spot of light is positionable at any point within a predetermined area.

5. Apparatus as defined in claim 4 wherein said imaginary circle is of the same diameter as said circle of said evenly spaced light collecting ends of said light guides such that the optical viewing axis of each is parallel to the axis of said optical system.

6. In a film reader, apparatus for deriving a dynamic reference signal proportional to the intensity of light from a source without obstructing any radiation from the source to a film through an optical system comprising:

a plurality of light guides, each having one end spaced in a circle between said source and said optical system, said circle being outside the flux path from said source to said film, said one end of each light guide having its viewing axis pointing in a direction toward said source and passing througgh an imaginary circle centered on said source, means for gathering together the other ends of said light guides in a bundle, said other ends being randomly positioned in said bundle, and means positioned to receive light from said bundled ends of said light guides for producing a signal proportional to the intensity of light from said source.

7. Apparatus as defined in claim 6 wherein each of said light guides has a uniform acceptance angle about its viewing axis for radiation from said source, and said one end of each light guide is positioned with its viewing axis parallel to an axis passing through the center of said source and through the center of said circle formed by said spaced light guides.

8. Apparatus as defined in claim 6 wherein each of said light guides has a uniform acceptance angle about its viewing axis for radiation from said source.

9. Apparatus as defined in claim 8 wherein said imaginary circle is of the same diameter as said circle formed by said spaced light guides.

10. Apparatus as defined in claim 6 wherein said source is a cathode ray tube.

11. Apparatus as defined in claim 10 wherein each light guide is comprised of a plurality of optical fibers bundled together.

12. Apparatus as defined in claim 11 wherein each of said light guides has a uniform acceptance angle about its viewing axis for radiation from said source, and said one end of each light guide is positioned with its viewing axis parallel to an axis passing through the center of said source and through the center of said circle formed by said spaced light guides.

13. In a film reader employing a flying spot scanner and an optical system for focusing a spot of light from said scanner on a film, means for deriving a dynamic reference signal proportional to the intensity of light from said flying spot scanner without obstructing any radiation to said film through said optical system, said means comprising a photometer and a plurality of light guides arranged with one end of each guide in a circle outside the flux path between said flying spot scanner and said optical system, said one end of each guide having its viewing axis pointing in a direction toward the flying spot scanner and passing through a circle centered on the flying spot scanner, and the other end of each light guide being gathered together in a bundle with the other end of every other light guide to direct light from said guides into said photometer.

14. The combination of claim 13 wherein each of said light guides has a uniform acceptance angle about its viewing axis for radiation from said flying spot scanner, and said one end of each light guide is positioned with its viewing axis parallel to an axis passing through the center of said source and through the center of said circle formed by said spaced light guides.

15. The combination of claim 14 wherein said flying spot scanner is a cathode ray tube.

* * * * *

UNITED STATES PATENT AND TRADEMARK OFFICE
CERTIFICATE OF CORRECTION

PATENT NO. : 3,992,620
DATED : November 16, 1976
INVENTOR(S) : Robert W. Waller

It is certified that error appears in the above–identified patent and that said Letters Patent are hereby corrected as shown below:

Column 1, line 16:   delete "meterological" and substitute --meteorological--;

Column 3, line 2:   delete "particularly" and substitute --particularity--;

Column 3, line 45:   delete "photomultipler" and substitute --photomultiplier--;

Column 3, line 67:   between "is" and "such", insert --of--;

Column 5, line 32:   delete "privelege" and substitute --privilege--;

Column 5, delete line 42.
Column 5, line 43:   delete "tions around said".

Signed and Sealed this

Thirty-first Day of October 1978

[SEAL]

Attest:

RUTH C. MASON
Attesting Officer

DONALD W. BANNER
Commissioner of Patents and Trademarks